United States Patent

[11] 3,611,877

[72] Inventor Michael David Baxter
  Rochester, England
[21] Appl. No. 954
[22] Filed Jan. 6, 1970
[45] Patented Oct. 12, 1971
[73] Assignee Hobourn-Eaton Manufacturing Company, Ltd.
  Kent, England
[32] Priority Jan. 6, 1969
[33] Great Britain
[31] 822/69

[54] MOTORS
  11 Claims, 5 Drawing Figs.
[52] U.S. Cl. ..................................... 91/376,
  91/416, 91/431
[51] Int. Cl. ..................................... F15b 9/10,
  F15b 15/17
[50] Field of Search ........................... 91/376,
  375, 416, 431

[56] References Cited
  UNITED STATES PATENTS
  1,548,232  8/1925  Westbrook .............. 91/376

| 2,369,324 | 2/1945 | Thompson | 91/375 |
| 2,969,774 | 1/1961 | Woodruff | 91/376 |
| 3,019,770 | 2/1962 | Balass | 91/376 |
| 3,044,451 | 7/1962 | Morrison | 91/376 |

Primary Examiner—Paul E. Maslousky
Attorney—Milton J. Wayne

ABSTRACT: A servomotor primarily for rack and pinion power steering comprises a piston rod extending through the end members of a cylinder and carrying a piston assembly within the cylinder. An operating shaft encircling the piston rod extends through one end member and has at its end adjacent the piston assembly a valve member which cooperates with the piston assembly to control the motor. A spring urges the piston assembly and the valve member axially into a central portion of the valve but permits relative displacement of the piston assembly and valve member axially relative to each other. The valve member is arranged to control a supply of pressure fluid, in response to movement of the operating shaft to move the valve member in one direction or the other from said central position relative to the piston, to move the piston in the same direction as the initiating movement of the valve member relative to the piston.

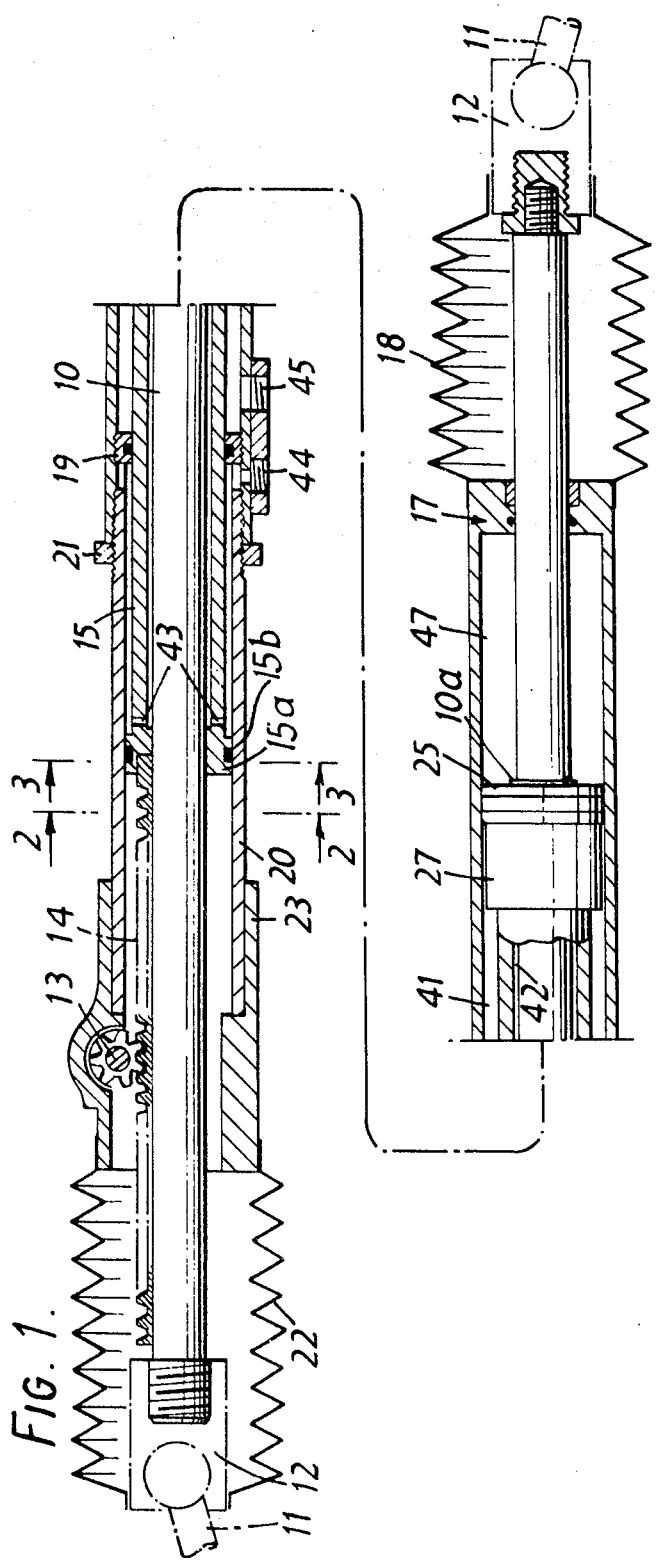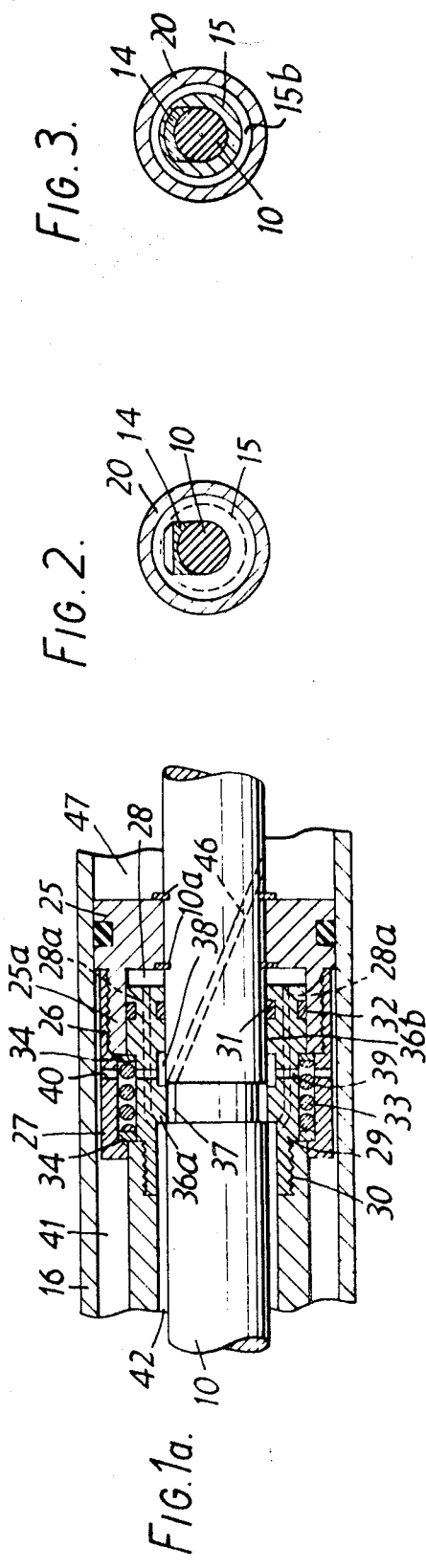

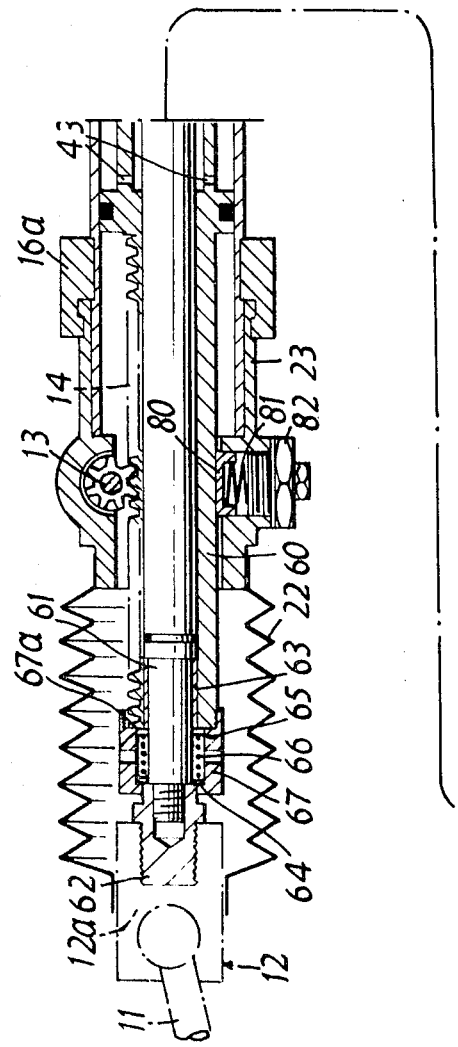
FIG. 4.
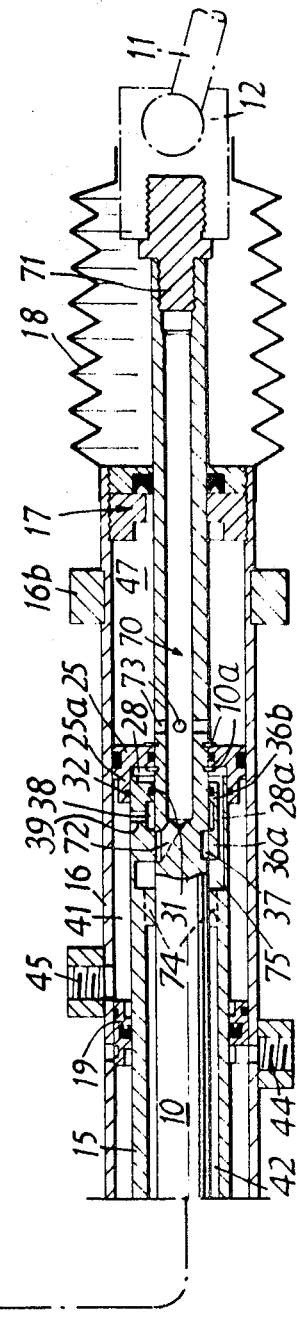

MOTORS

This invention relates to servomotors and has a particularly useful but not exclusive application in rack and pinion power steering mechanisms for motor vehicles.

According to this invention there is provided a servomotor comprising a fixed cylinder, a piston assembly comprising a piston slidably mounted in the cylinder and a piston rod on which the piston is secured, the cylinder having a first end member through which the piston rod extends and with which the rod forms a seal, an annular valve member disposed within the cylinder and encircling the piston rod, an annular operating shaft having the valve member secured to one end thereof and extending slidingly through the other end member of the cylinder and forming a seal therewith, said valve member forming with the piston assembly a valve operable to control the motor, and resilient means urging the valve member into an axially central position of control relative to the piston assembly and permitting limited axial movement of the valve member relative to the piston assembly in each direction from said central position, said valve member being adapted and arranged to control a supply of pressure fluid, in response to movement of the operating shaft to move the valve member in one direction or the other from said central position relative to the piston, to move the piston in the same direction as the initiating movement of the valve member relative to the piston.

According to a preferred feature of the invention the valve provides two variable restrictions in series between an inlet, which communicates with a source of pressure fluid, and an outlet, pressure fluid upstream of the two restrictions being applied to one side of the piston and the pressure fluid from between the two restrictions being supplied for application to the other side of the piston, movement of the valve member in each axial direction from said position operating to adjust the two restrictions in opposite senses to each other.

According to another preferred feature of the invention the ratio of the effective areas of the piston at said one side and said other side is equal to the ratio of the pressure drop across the first restrictions to the total pressure drop across the two restrictions when the valve member is in said central position.

In preferred arrangements, the cylinder provides an inlet for pressure fluid to the cylinder space between the piston and said other end member, and the valve member defines with the piston assembly the two restrictions and an intermediate chamber between the restrictions, a passage being provided in the piston assembly from said intermediate chamber to the cylinder space between the piston and said one end member.

According to another preferred feature of the invention, an annular land is formed within the valve member and is disposed opposite an annular groove in the rod, an annular recess being formed at each axial side of the land, which recesses are in permanently open communication with a source of pressure fluid and said outlet respectively, and the land being axially shorter than the groove so that the two axial end edges of the land cooperate with the two axial end edges of the groove to form the said two restrictions respectively.

The invention also provides a rack and pinion power steering mechanism for a motor vehicle, which mechanism comprises a servomotor as set forth in the second paragraph of this statement, said rod constituting a track rod, and the operating shaft having a rack secured thereto or having rack teeth formed thereon.

Two embodiments of the invention will now be described by way of example with reference to the accompanying drawings, in which:

FIG. 1 illustrates in axial section a rack and pinion power steering apparatus according to the invention, FIG. 1a is an enlarged view of a portion of FIG. 1, FIGS. 2 and 3 are respectively sectional views on the lines 2—2 and 3—3 of FIG. 1, and FIG. 4 is a view corresponding to FIG. 1 of a second construction of power steering apparatus embodying the invention. Referring to FIGS. 1 to 3 of the drawings, the track rod for transmitting steering movements to the steerable wheels of a motor vehicle comprises a central portion 10 and end portions 11 pivotally secured to opposite ends of the portion 10 by ball-and-socket couplings 12. The other ends of the portions 11 are pivotally connected by any convenient means to the pivoted track arms (not shown) which are in turn fixedly connected to stub shafts for the steerable wheels. The steering movements of the steering wheel (not shown) are arranged to rotate a pinion 13 rotatably mounted on the chassis of the vehicle, and this pinion meshes with a toothed rack 14 which rests on but is not secured to the central portion 10 of the track rod. At one end, the rack is secured, as by brazing, to one end of a hollow shaft 15. This end of shaft 15 is slidably supported on the portion 10 of the track rod, and the shaft extends into an actuating cylinder 16.

Cylinder 16 is coaxial with portion 10 of the track rod and is fixedly mounted on the chassis of the vehicle by any convenient means. Portion 10 of the track rod extends centrally through the full length of cylinder 16. At its end remote from the rack, cylinder 16 has an end cap 17 in which the portion 10 of the track rod is slidingly and sealingly mounted, and a flexible bellows 18 is connected between this end of cylinder 16 and the nearer ball-and-socket connection 12 to keep dust and other abrasive matter off the track rod portion 10. At its end nearer the rack 14, cylinder 16 has secured internally thereof an annular end member 19 which forms a sliding support for and seal with the external surface of annular shaft 15. A rigid tubular member 20 is adjustably screwed into the end of cylinder 16 and can be secured in selected positions of adjustment by means of a lock nut 21. Hollow shaft 15 has a peripheral flange 15a at its end attached to the rack, and this flange has a sealing ring 15b forming a sliding seal with the internal surface of tubular member 20. Tubular member 20 has secured to it one end of a tubular extension 23, and a second dust-excluding bellows 22 is connected between the opposite end of extension 23 and the adjacent ball-and-socket connection 12.

A piston 25 is slidably mounted in the cylinder 16 and is secured on the track rod portion 10 by circlips 10a mounted in grooves in the track portion 10. Piston 25 has an annular axial extension 25a which projects towards end member 19 and which has externally mounted thereon, as by screw threads 26, a sleeve 27.

A valve member 29 is secured, as by screw threads 30 to the inner end of annular shaft 15 and is mounted radially between track rod portion 10 and piston 25 and sleeve 27 for axially sliding movement. The free end of valve member 29 is slidably engaged within extension 25a of the piston and a chamber 28 is formed between this end of the valve member and piston 25. To prevent leakage into chamber 28, sealing rings 31, 32 are respectively mounted in internal and external grooves on the valve member, but the chamber is vented to a low pressure region by passages 28a extending through the valve member.

An outwardly facing square-sided channel is formed jointly by shaft 15 and the valve member, and a corresponding inwardly facing channel is formed jointly by sleeve 27 and piston 25. The two channels together form a housing for a compression spring 33, thrust rings 34 being disposed between the respective ends of the spring and the housing. It will be understood that spring 33 biases the valve member into a central axial position relative to piston 25 and sleeve 27, but that the valve member can be displaced in either axial direction relative to the piston and sleeve against the restraint of the spring.

Valve member 29 is a spool valve member and has spaced internal annular lands 36a, 36b. Land 36a is disposed opposite an annular groove 37 in the external surface of track rod portion 10, but is axially slightly shorter than groove 37. Between lands 36a, 36b the valve member has an internal annular groove 38 which communicates through radial passages 39 in the valve member, the spring housing and radial passages 40 in the sleeve 27 with the cylinder space 41 between cylinder 16 and shaft 15 at the left-hand side of the piston. Pressure fluid is supplied into the cylinder space 41 through an inlet connection 45 on the external surface of cylinder 16. Sealing ring 31 is disposed in land 36b. At the opposite side of land 36a to groove 38, an annular passage 42 is defined between track rod portion 10 and shaft 15, and chamber 42 communicates through radial holes 43 at the left-hand end of shaft 15 with an annular space formed between tubular member 20 and shaft 15. This annular space in turn leads to an outlet connection 44 disposed near the inlet connection 45 but on the opposite side of the end member 19. The vent passages 28a from chamber 28 open to annular passage 42.

An inclined passage 46 extends through the track rod portion 10 from groove 37 to the cylinder space 47 at the opposite side of piston 25. The cross-sectional area of cylinder space 47 is twice that of cylinder space 41.

The operation of the mechanism is as follows. When no force is applied to the steering wheel, the valve member 29 remains in the central position in which it is shown in the drawing. Pressure fluid entering through the inlet connection 45 flows along cylinder space 41, through radial passages 40, the spring chamber and radial passages 39 into groove 38 and thence leaks into groove 37 and annular passage 42, whence the fluid returns through radial holes 43 to the outlet connection 44. On the left-hand side of the piston the pressure is applied to the piston area bounding cylinder space 41. Chamber 28 receives any leakage which takes place past the O-rings 31 and 32, and this chamber is at the same pressure as annular passage 42, which is at the return pressure to pump reservoir and should be marginally in excess of atmospheric pressure. The effect of this pressure on the valve and ram is normally negligible. Since the groove 37 is between two equal restrictions disposed in series in the fluid flow path from cylinder space 41, the pressure in groove 37 and hence in the cylinder space 47 is half of the pressure in space 41. Thus, since the effective area of the annular piston where it bounds cylinder space 47 is twice that where it bounds cylinder space 41, and the pressure applied to the full area of the annular piston on its right-hand side by virtue of the inclined passage 46 is one-half the value of the pressure in cylinder space 41 on the left-hand side of the piston, the opposing loads applied to the piston are equal and the piston and track rod remain stationary. There is, of course, a steady flow of pressure fluid from the inlet connection 45 to the outlet connection 44.

When rack 14 is moved to the left, valve 29 also moves to the left compressing spring 33, and land 36a moves to block the connection between groove 37 and annular passage 42. Equal pressures are therefore applied in cylinder space 41 and (by reason of the passage 46) in cylinder space 47. Since the effective area of the right-hand side of the piston is greater than that of the left-hand side, chamber 28 being at low pressure, piston 25 and the track rod portion 10 are moved leftwards with annular shaft 15 and the rack. Fluid displaced from cylinder space 41 by this movement flows into the right-hand cylinder space 47 through passage 46.

When the rack is moved to the right, land 36a blocks off communication between grooves 38 and 37 so that pressure builds up in the cylinder space 41 and drives the piston 25 and track rod portion 10 to the right. Fluid displaced from the right-hand cylinder space 47 passes through passage 46 and thence through groove 37 to annular passage 42 and to the outlet 44.

Whether the rack is moved to the left or to the right, the instant the load is removed from the rack, spring 33 returns the valve member 29 to its central neutral position and the forces on opposite sides of piston 25 become equal again.

Since the cross-sectional area of cylinder space 47 is twice that of cylinder space 41, the flow into the cylinder space 41 when the piston moves to the right, neglecting leakage flow through the valve, is equal to the cross-sectional area of cylinder space 41 multiplied by the travel of the piston 25. When the piston is moving to the left, the flow into the cylinder space 41 is, neglecting leakage flow through the valve, equal to the multiple of the travel of piston 25 and the difference between the cross-sectional area of cylinder space 47 and that of cylinder space 41. This ratio of areas of the cylinder spaces 47 and 41 also enables the maximum force to be applied to the piston in both directions of operation, neglecting the previously mentioned effect of the pressure in the chamber connected to outlet 44 which effect is usually small. The vent passage 28a between chamber 28 and annular passage 42 prevents this effect from being upset by the leakage of pressure fluid past the sealing rings 31, 32.

In the event of the loss of fluid pressure, movement of the rack in either direction causes the spring 33 to become more fully compressed and thereafter to transmit the steering forces direct to the piston rod portion 10.

In other arrangements the relationship of the effective areas of the two sides of the piston may differ from that in the illustrated construction.

A bleed tube (not shown) extends between the bellows 18 and the fluid reservoir to prevent any buildup of pressure within the bellows due to leakage along the track rod portion 10 past the end cap into the bellows.

In an alternative construction bellows 22 is replaced by a telescopic tube arrangement.

In the modified version shown in FIG. 4, in which corresponding parts are indicated by the same reference numerals, the reaction spring is disposed at the left-hand end of track rod portion instead of within the piston assembly as in the construction of FIGS. 1 to 3. For this purpose, the rack teeth are formed on an annular extension 60 of hollow shaft 15, and the adjacent end portion of track rod portion 10 is reduced in diameter as at 61 and has screw-threaded end engaged within a connecting piece 62 which is in turn screwed into coupling block 12a of coupling 12. A bush 63 is disposed on the reduced part 61 of track rod portion 10 and terminates flush with the end of the rack. Two collars 64, 65 encircle part 61 in abutment with connecting piece 62 and the flush ends of the rack and bush 63 respectively. The reaction spring 66 encircles the reduced part 61 between the collars. A sleeve 67 is screwed on to the end of the rack and has an internal shoulder 67a abutting the end face of the rack. The opposite end of the sleeve has an inwardly directed flange which abuts the outer peripheral part of collar 64 flush with the adjacent end face of connecting piece 62. The sleeve has vent holes 68 opening from the annular space containing the spring to the space within the bellows.

Instead of the inclined passage 46, the right-hand end part of the track rod portion 10 has a central counterbore 70 the right-hand end of which is sealed by a connecting piece 71 and which opens to groove 37 through an inclined drilling 72 and to the cylinder space 47 through radial drillings 73.

Axial slots 74 in the rack place annular chamber 42 in permanently open communication with an annular recess 75 in the rack from which the vent passages 28a lead to chamber 28.

It will be seen that spring 66 performs exactly the same functions as spring 33 in the arrangement of FIGS. 1 to 3, in that it urges shaft 15 and the rack, and therefore the valve lands 36a, 36b, into a central position with respect to the track rod portion 10 and its valve groove 37, and the arrangement operates in exactly the same way as the previously described arrangement. This construction simplifies the piston and the piston end portion of shaft 15 since there is no spring chamber at this point, and radial passages 39 in the shaft 15, the right-hand end portion of which itself constitutes the servo valve member, extend from cylinder space 41 to groove 38.

In the construction of FIG. 4, the extension 23 of cylinder 16 supports a pressure pad 80 loaded by a spring 81 seated against a plug 82 screwed into the extension, and the pad supports the rack against deflection away from the pinion 13. Also, in this construction the cylinder has portions 16a, 16b by which it can be secured to the frame of a vehicle.

In either of the above-described constructions, the pitch of the rack teeth may vary progressively from the middle of the rack towards the ends, the teeth of the pinion being of constant pitch. Thus, in one construction, the pitch of the rack teeth increases progressively from the middle of the rack towards each end of the rack. In an alternative construction, however, where a lesser mechanical advantage is preferred for greater steering angles, the pitch of the rack teeth reduces progressively from the middle towards each end of the rack.

The illustrated constructions provide a very simple valve arrangement which is reliable and relatively inexpensive. In addition, since the valve is disposed within the actuator piston and cylinder arrangement, the actuator has a smoother external profile and consequently occupies less space under the vehicle. Further, the actuator can with minor adjustments to overall length and stroke be made to fit a wide range of rack and pinion systems with few alterations to the vehicle, because the space required for fitting is only slightly larger than the normal manual arrangement.

I claim:

1. A servomotor comprising a fixed cylinder, a piston assembly comprising a piston slidably mounted in the cylinder and a piston rod on which the piston is secured, the cylinder having a first end member through which the piston rod extends and with which the rod forms a seal, an annular valve member disposed within the cylinder and encircling the piston rod, an annular operating shaft having the valve member secured to one end thereof and extending slidingly through the other end member of the cylinder and forming a seal therewith, said valve member forming with the piston assembly a valve operable to control the motor, and resilient means urging the valve member into an axially central position of control relative to the piston assembly and permitting limited axial movement of the valve member relative to the piston assembly in each direction from said central position, said valve member being adapted and arranged to control a supply of pressure fluid, in response to movement of the operating shaft to move the valve member in one direction or the other from said central position relative to the piston, to move the piston in the same direction as the initiating movement of the valve member relative to the piston.

2. A servomotor as claimed in claim 1, wherein the valve provides two variable restrictions in series between an inlet, which communicates with a source of pressure fluid, and an outlet, pressure fluid upstream of the two restrictions being applied to one side of the piston and the pressure fluid from between the two restrictions being supplied for application to the other side of the piston, movement of the valve member in each axial direction from said position operating to adjust the two restrictions in opposite senses to each other.

3. A servomotor as claimed in claim 2, wherein the ratio of the effective areas of the piston at said one side and said other side is equal to the ratio of the pressure drop across the first restriction to the total pressure drop across the two restrictions when the valve member is in said central position.

4. A servomotor as claimed in claim 3, wherein when the valve member is in said central position, the two restrictions are equal, the effective areas of the piston at said other side and said one side being in ratio 2:1.

5. A servomotor as claimed in claim 2, wherein the cylinder provides an inlet for pressure fluid to the cylinder space between the piston and said other end member, and the valve member defines with the piston assembly the two restrictions and an intermediate chamber between the restrictions, a passage being provided in the piston assembly from said intermediate chamber to the cylinder space between the piston and said one end member.

6. A servomotor as claimed in claim 2, wherein the piston rod extends through the annular operating shaft, and an annular passage is formed between the piston rod and the operating shaft, which passage communicates with an outlet connection on the operating shaft which connection is permanently disposed beyond said other end member of the cylinder, i.e. outside the cylinder.

7. A servomotor as claimed in claim 2, wherein an annular land is formed within the valve member and is disposed opposite an annular groove in the rod, an annular recess being formed at each axial side of the land, which recesses are in permanently open communication with a source of pressure fluid and said outlet respectively, and the land being axially shorter than the groove so that the two axial end edges of the land cooperate with the two axial end edges of the groove to form the said two restrictions respectively.

8. A servomotor as claimed in claim 7, wherein the piston assembly provides two annular axially facing abutment surfaces which face and are fixed with respect to each other, and the assembly of the operating shaft and valve member provides two annular axially facing abutment surfaces which face and are fixed with respect to each other, and which are respectively aligned in a radial direction with the two first-mentioned abutment surfaces, and wherein the resilient means comprises a compression spring acting between the two radially aligned pairs of abutment surfaces.

9. A servomotor as claimed in claim 1, wherein the operating shaft has a rack secured on its end portion outside the cylinder, and wherein a pinion is mounted in a casing portion which is fixed with respect to the cylinder, which pinion meshes with the rack.

10. A servomotor as claimed in claim 1, wherein the portion of the operating shaft outside the cylinder is formed with rack teeth, and wherein a pinion is mounted in a casing portion which is fixed with respect to the cylinder, which pinion meshes with the rack.

11. A vehicle power steering arrangement incorporating a servomotor as claimed in claim 10, wherein opposite ends of the piston rod are adapted for connection to the steering track arms of the vehicle.